Aug. 16, 1949.  W. E. CARDINAL  2,479,098
DEVICE FOR LOCATING SUBMERGED ARTICLES
Filed May 21, 1947  2 Sheets-Sheet 1
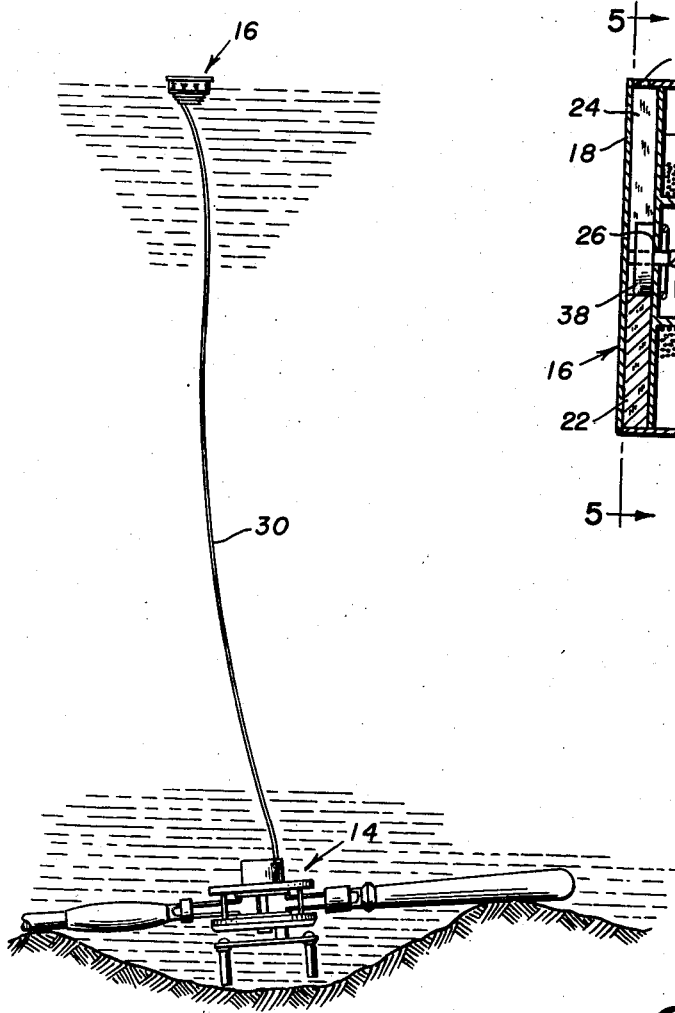
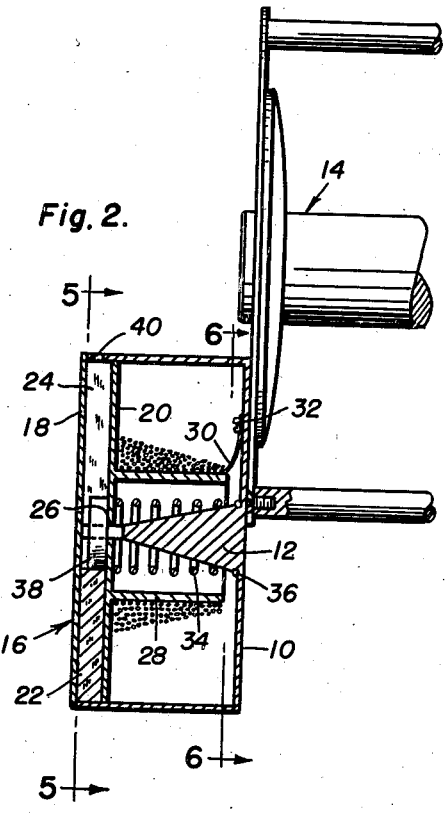
Inventor
William E. Cardinal
By Clarence A. O'Brien
and Harvey B. Jacobson
Attorneys Aug. 16, 1949. W. E. CARDINAL 2,479,098
DEVICE FOR LOCATING SUBMERGED ARTICLES
Filed May 21, 1947 2 Sheets-Sheet 2
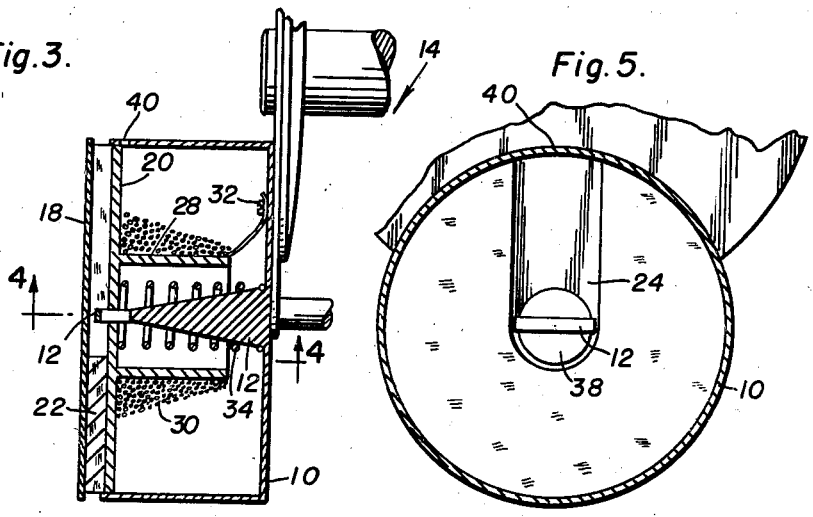
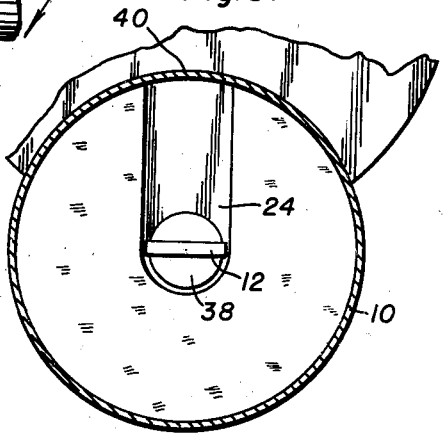
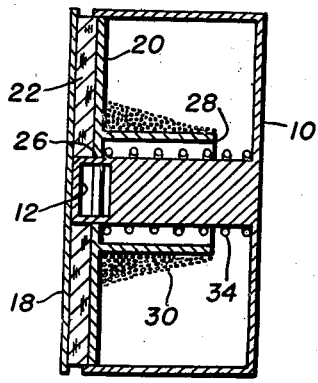
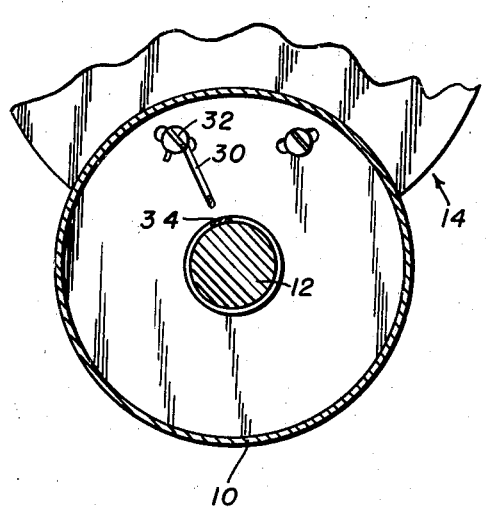
*Inventor*
William E. Cardinal
By *Clarence A. O'Brien and Harvey B. Jacobson*
*Attorneys*

Patented Aug. 16, 1949

2,479,098

UNITED STATES PATENT OFFICE 2,479,098

DEVICE FOR LOCATING SUBMERGED ARTICLES

William E. Cardinal, Madison, Fla., assignor of fifty per cent to Joe G. Allen, Montgomery, Ala.

Application May 21, 1947, Serial No. 749,449

6 Claims. (Cl. 9—9)

This invention appertains to novel and useful improvements in devices for indicating the location of submerged articles, particularly fishing reels, outboard motors, tackle boxes and the like.

An object of this invention is to provide a housing having a portion of an improved latching means for use particularly in the use of the present invention and forming a portion thereof.

A salient object of this invention is to provide soluble means, preferably in the form of a tablet, for retaining a buoyant cover means on said housing.

A further object of this invention is to provide means for resiliently biasing the cover means from the housing thereby holding a soluble tablet latch keeper in a fixed position.

A still further object of this invention is to provide an extremely inexpensive device of this nature which is simple in construction, inexpensive to operate and which lends itself well to commercial manufacture.

Other objects and features of novelty shall become apparent to those skilled in the art, in following the description of the preferred embodiment of the present invention, illustrated in the accompanying drawings, wherein:

Figure 1 is a pictorial view of one use of the present invention;

Figure 2 is a sectional side view of a preferred form of the present invention showing the same attached to a fishing reel;

Figure 3 is a sectional view similar to that shown in Figure 2 showing the cover means partially removed;

Figure 4 is a transverse sectional view of the invention disclosed in Figure 3 and taken substantially on the line 4—4 thereof and in the direction of the arrows, the fishing reel being removed;

Figure 5 is a sectional view of the invention shown in Figure 2, taken substantially on the line 5—5 thereof and in the direction of the arrows; and Figure 6 is a sectional view of the invention disclosed in Figure 2 and taken substantially on the line 6—6 thereof and in the direction of the arrows.

Referring now in detail to the illustrated preferred embodiment of the present invention, like reference characters are used throughout to indicate similar elements thereof.

This invention has been developed to provide a device for indicating the approximate location of submerged articles such as outboard motors, fishing reels, lunch boxes, or any other item which might be inadvertently lost in a body of water.

The preferred material of construction of the present invention is commercial plastic however, it is obvious that other substitutions of material might be made.

One of the prime features of the present invention is the utility of commercial aspirin tablets to form a portion of the latch means to be described herein. The cost of aspirin is notoriously low and aspirin is available throughout many countries and at substantially all developed portions of said many countries. In other words, aspirin is both inexpensive and available therefore, desirable as a soluble locking element in the present invention.

Taking Figure 2, there is disclosed a housing 10 having a bifurcated, substantially U-shaped member 12 extending from the bottom thereof. This housing is provided for the purpose of being received on any conventional element as set forth hereinabove, the fishing reel 14 being disclosed for illustrative purposes. Of course, any suitable conventional securing means might be utilized for holding the housing 10 on a reel or the like.

A cover means is detachably received on the said housing 10 and is generally indicated by the reference numeral 16. This cover means is preferably composed of a pair of substantially parallel plates 18 and 20 respectively having buoyant material, preferably cork 22 interposed therebetween. Any suitable securing means might be used in holding the cork in place in fixed relation, gluing being the most expedient when plastic is utilized. A slot 24 is provided in the buoyant means 22, the slot being of dimensions to accommodate the standard size aspirin tablet. Another slot 26 extends through the plate 20, communicating with the said slot 24. This latter slot is for the purpose of receiving the terminal portions of the U-shaped member 12 described above.

An arbor 28 extends from the said plate 20 and a string means 30 is wound therearound. One end of the said string means 30 is secured to the said housing 10 by any suitable means, preferably a simple eye or screw connection 32. The other end of the said string 30 is suitably secured to the cover means. Means for resiliently biasing the cover means out of the said housing 10 is provided. The preferable construction of said resilient biasing means is a simple coil spring 34 encircling the said member 12, being anchored thereto as by a tight fit in a groove 36. The other end of the said spring means 34 engages the plate 20, thereby urging the same away from the said housing bottom.

The operation of the invention is now quite apparent. An aspirin tablet 38 is received somewhere in the slot 24, then the cover means is inserted in the housing 10. The terminal portion of the said bifurcated latch 12 is received in the said slot 26 and the spring 34 is obviously compressed. The invention is then tilted to permit the aspirin tablet to slip under the upper portion of the bifurcated latch 12. If, for some reason, the tablet refuses to slide in the desired position, an elongated object, such as a match stick, might be inserted in the aperture 40 for urging the aspirin forward. After the aspirin tablet 38 is finally in its proper location (see Fig. 2) the spring 34 is permitted to bias the said tablet 38 against the wall 20 of the said lid and against the uppermost portion of the latch 12. Upon submersion in an aqueous medium, liquid may seep into the aperture 40 and after a few seconds the aspirin tablet loses a portion of its consistency. At this stage, the spring 34 violently urges the cover means 16 from the housing and the said cover means floats to the surface due to its buoyant nature. Then, all that is necessary to discover the location of the fallen or lost article is to observe the position of the cover means 16.

While there has been described and illustrated but a single preferred embodiment of the present invention, it is apparent to those skilled in the art that various changes including omissions, additions and rearrangement of elements may be made herein without departing from the spirit of the invention. Accordingly, limitation is sought only in accordance with the scope of the following claims.

Having thus described this invention, what is claimed as novel and improved is:

1. Means for indicating the location of submerged articles including a housing, buoyant cover means removably secured to said housing, means for resiliently biasing said cover means from said housing, latch means cooperating with said housing and engaging said cover means, string means secured to said housing and said cover means, said latch means comprising a substantially U-shaped member secured to said housing, the web thereof extending within said cover means and a soluble tablet interposed between said web and a portion of said cover means.

2. Means for indicating the location of submerged articles including a housing, a buoyant cover removably secured to said housing, means reacting on said housing and said cover resiliently biasing said cover from said housing, latch means cooperating with said housing and engaging said cover means, a flexible elongated member secured to said housing and said cover, said latch means including an opening in said cover having a soluble tablet disposed at least partially thereover and a keeper on said housing passed through said opening lockingly engaging said tablet.

3. Means for indicating the location of submerged articles including a housing, a buoyant member removably secured to said housing, means reacting on said housing and said member resiliently biasing said member from said housing, latch means cooperating with said housing and said member, said latch means including an opening in said member having a soluble tablet disposed at least partially thereover and a keeper on said housing lockingly engaging said tablet, said buoyant member being held in position with respect to said housing by said resilient biasing means urging said member outwardly from said housing thereby pressing said keeper firmly against said tablet and said member.

4. Means for indicating the location of submerged articles, including a housing, buoyant cover means removably secured to said housing, means for resiliently biasing said cover means from said housing, latch means cooperating with said housing and engaging said cover means, string means secured to said housing and said cover means, said latch means including a soluble tablet and a keeper on said housing engaging said tablet, said cover means comprising a lid having spaced plates therein, means for receiving said soluble tablet between said plates, buoyant material between said plates, a slot in a selected plate for receiving said keeper.

5. A device for indicating the location of submerged articles comprising a housing adapted to be fixed to an article, a bifurcated keeper fixed to said housing, buoyant cover means, means for detachably securing said housing to said cover means, cable means secured to said housing and said cover means, said detachable securing means including an aperture in said cover means, a soluble tablet disposed over said aperture lockingly engaged by said bifurcated keeper.

6. A device for indicating the location of submerged articles comprising a housing adapted to be fixed to an article, a bifurcated keeper fixed to said housing, a buoyant cover means, means for detachably securing said housing to said cover means, cable means secured to said housing and said cover means, said detachable securing means including an aperture in said cover means, a soluble tablet disposed over said aperture lockingly engaged by said bifurcated keeper, means for resiliently biasing said cover means from said housing.

WILLIAM E. CARDINAL.

REFERENCES CITED

The following references are of record in the file of this patent:

UNITED STATES PATENTS

| Number | Name | Date |
|---|---|---|
| 806,730 | Zoll | Dec. 5, 1905 |
| 1,177,889 | Ostergren et al. | Apr. 4, 1916 |
| 2,261,513 | Donnerstog | Nov. 4, 1941 |
| 2,415,863 | Bell et al. | Feb. 18, 1947 |